United States Patent
Nathaniel et al.

(10) Patent No.: US 11,281,899 B2
(45) Date of Patent: Mar. 22, 2022

(54) METHOD AND SYSTEM FOR DETERMINING OCCUPANCY FROM IMAGES

(71) Applicant: POINTGRAB LTD., Hod Hasharon (IL)

(72) Inventors: Ram Nathaniel, Tel Aviv (IL); Moshe Nakash, Kiryat Ono (IL); Uri Zackhem, Kfar Saba (IL)

(73) Assignee: POINTGRAB LTD., Hod Hasharon (IL)

( * ) Notice: Subject to any disclaimer, the term of this patent is extended or adjusted under 35 U.S.C. 154(b) by 57 days.

(21) Appl. No.: 16/609,516

(22) PCT Filed: Apr. 26, 2018

(86) PCT No.: PCT/IL2018/050459
§ 371 (c)(1),
(2) Date: Oct. 30, 2019

(87) PCT Pub. No.: WO2018/203325
PCT Pub. Date: Nov. 8, 2018

(65) Prior Publication Data
US 2020/0074166 A1    Mar. 5, 2020

(30) Foreign Application Priority Data
Apr. 30, 2017   (IL) .......................................... 252032

(51) Int. Cl.
*G06K 9/00*    (2006.01)
*G06K 9/36*    (2006.01)
*G06K 9/62*    (2006.01)
*G06T 7/20*    (2017.01)

(52) U.S. Cl.
CPC ........... *G06K 9/00369* (2013.01); *G06K 9/36* (2013.01); *G06K 9/6232* (2013.01); *G06T 7/20* (2013.01); *G06T 2207/30196* (2013.01)

(58) Field of Classification Search
CPC .... G06K 9/00369; G06K 9/36; G06K 9/6232; G06T 7/20; G06T 2207/30196
See application file for complete search history.

(56) References Cited

U.S. PATENT DOCUMENTS

| | | | |
|---|---|---|---|
| 10,083,352 B1* | 9/2018 | Solh | G06K 9/00335 |
| 2011/0019920 A1* | 1/2011 | Hu | G06K 9/00261 |
| | | | 382/195 |
| 2011/0129126 A1* | 6/2011 | Begeja | G06F 16/784 |
| | | | 382/118 |
| 2011/0211746 A1* | 9/2011 | Tran | G06K 9/00 |
| | | | 382/137 |

(Continued)

*Primary Examiner* — Ming Y Hon
(74) *Attorney, Agent, or Firm* — AlphaPatent Associates, Ltd; Daniel J. Swirsky (57) ABSTRACT

Embodiments of the invention relate to a method for determining that an object in a sequence of images is a human. The method may include the steps of detecting an object in a first image from the sequence of images and assigning a first score to the object. The object is tracked to a second image from the sequence of images and a second score is assigned to the object in the second image. The second score is compared to a threshold that is inversely related to the first score and a determination that the object in the second image is a human is made based on the comparison.

10 Claims, 8 Drawing Sheets

(56) References Cited

U.S. PATENT DOCUMENTS

| | | | |
|---|---|---|---|
| 2013/0287254 A1* | 10/2013 | Teyssier | G06K 9/00228 |
| | | | 382/103 |
| 2016/0379061 A1* | 12/2016 | Zhang | G06T 7/75 |
| | | | 382/103 |
| 2016/0381240 A1* | 12/2016 | Koguchi | G06K 9/00369 |
| | | | 358/1.13 |
| 2017/0061241 A1 | 3/2017 | Rastgar et al. | |
| 2017/0091542 A1* | 3/2017 | Levy | G06K 9/00335 |
| 2017/0104915 A1* | 4/2017 | Adachi | G06K 9/3233 |
| 2018/0308329 A1* | 10/2018 | Lo | G08B 25/008 |
| 2019/0080153 A1* | 3/2019 | Kalscheur | G06K 9/00255 |
| 2019/0122065 A1* | 4/2019 | Ungarish | G06K 9/00369 |
| 2020/0175693 A1* | 6/2020 | Takada | G06T 7/20 |
| 2020/0380252 A1* | 12/2020 | Ding | G08B 13/19645 |

\* cited by examiner

METHOD AND SYSTEM FOR DETERMINING OCCUPANCY FROM IMAGES

FIELD

The present invention relates to the field of computer vision, specifically, to automatic detection of a human or other occupant in images.

BACKGROUND

The ability to detect and monitor occupants in a space, such as a room or building, enables planning and controlling home or building systems for better space utilization, to minimize energy use, for security systems and more.

Computer vision is sometimes used to analyze an imaged space and to detect occupants in the space.

There exist systems that use one or more cameras to monitor a space or area. Some of these systems use cameras located in a ceiling of a monitored area providing overhead tracking of occupants. However, in the case of overhead tracking the shapes of people's bodies are highly deformable and show very high perspective distortion. Thus, top view images are not easily understood by current image analysis techniques and these systems do not easily detect humans in images.

SUMMARY

Embodiments of the invention enable to determine that an object in an image is a human based on a score assigned to the object or based on a probability of the object of being a human, in a preceding image, thereby facilitating accuracy and efficiency of automatic detection of humans in the images.

In one embodiment there are provided a system and method for determining that an object in a sequence of images is a human by detecting an object in a first image from the sequence of images, assigning a score to the object, tracking the object to a second image from the sequence of images, determining that the object in the second image is a human based on the score assigned to the object in the first image and outputting a signal based on the determination that the object in the second image is a human.

Typically, shape detection algorithms are applied on the first image and/or second image to detect a shape of the object in the first and/or second image.

In one embodiment the score is assigned based on a shape of the object in the first image. In some embodiments the score is assigned based on the shape of the object and/or based on other parameters of the object such as motion of the object and location of the object in the first image.

Determining that the object in the second image is a human is based on the score assigned to the object in the first image, the shape of the object in the second image and optionally based on additional parameters of the object in the second image.

In some embodiments a threshold that is inversely related to the score assigned to the object in the first image, is determined. A second score is assigned to the object in the second image and a determination that the object in the second image is a human is made if the second score is above the threshold.

In some embodiments the second score is determined based on a shape of the object in the second image.

In some embodiments a method and system for determining occupancy in a space, include assigning a first score to an object (e.g., based on the shape of the object) in an image from a sequence of images of the space and assigning a second score to the object in a later image from the sequence of images, the second score being dependent on the first score. A signal indicating occupancy may be generated if the second score is above a predetermined threshold. The threshold for the second score may be changed based on a value of the first score.

In other embodiments a first score is assigned to an object in an image from a sequence of images of the space and a second score is assigned to the object in a later image from the sequence of images, the second score being dependent on the first score. The first score and second score are combined to obtain a combined score and a signal indicating occupancy is generated based on the combined score.

One embodiment of the invention relates to a method for determining that an object in a sequence of images is a human. The method, which is carried out on a processor, may include the steps of detecting an object in a first image from the sequence of images; assigning a first score to the object; tracking the object to a second image from the sequence of images; assigning a second score to the object in the second image; comparing the second score to a threshold that is inversely related to the first score; determining that the object in the second image is a human based on the comparison; and controlling a device based on the determination that the object in the second image is a human.

The sequence of images may include top view images of the space.

The first score may be assigned to the object based on a shape of the object in the first image.

Alternatively or in addition, the first score may be assigned to the object based on motion of the object.

Alternatively or in addition, the first score may be assigned to the object based on location of the object in the first image.

Alternatively or in addition, the first score may be assigned to the object based on a size of the object in the first image.

In some embodiments the method may include determining that the object in the second image is a human based on a shape of the object in the second image and based on the comparison to the threshold.

In other embodiments the method may include determining that the object in the second image is a human based on motion of the object in the sequence of images and based on the comparison to the threshold.

In yet further embodiments the method may include determining that the object in the second image is a human based on a location of the object in the second image and based on the comparison to the threshold.

In some embodiments the second score may be determined based on a shape of the object in the second image.

Another embodiment of the invention relates to a method for determining occupancy in a space. The method, which is carried out on a processor, may include the steps of assigning a first score to an object in an image from a sequence of images of the space; assigning a second score to the object in a later image from the sequence of images, the second score dependent on the first score and on a location of the object in the later image; outputting a signal indicating occupancy based on the second score.

In this method the first score may be assigned based on a shape of the object in the image.

Alternatively or in addition, the first score may be assigned based on motion of the object. The motion may include typical human movements.

Alternatively or in addition, the first score may be assigned based on a location of the object in the image. The location of the object in the image may include a location within a predetermined area.

The first score may be assigned based on a size of the object in the image and based on the location of the object in the image.

In some embodiments the location of the object in the later image is a location within a predetermined area.

In some embodiments the method includes changing a threshold for the second score based on a value of the first score.

In some embodiments the method includes determining a weight of the second score based on a value of the first score.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Embodiments of the invention provide methods and systems for determining that an object in an image of a space is a human. The determination may be used to determine occupancy in the space.

"Determining occupancy" or "detecting occupancy" may include detecting an occupant and/or monitoring one or more occupants by detecting occupants and/or inferring existence of occupants throughout the space e.g., counting occupants, tracking occupants, determining occupants' location in a space, etc.

The examples described below refer to a human occupant in a space however, "occupant" may refer to any type of body in a space, such as a human and/or animal and/or inanimate object. Thus, embodiments of the invention may be used to detect human and/or non-human occupants.

Figure 1:
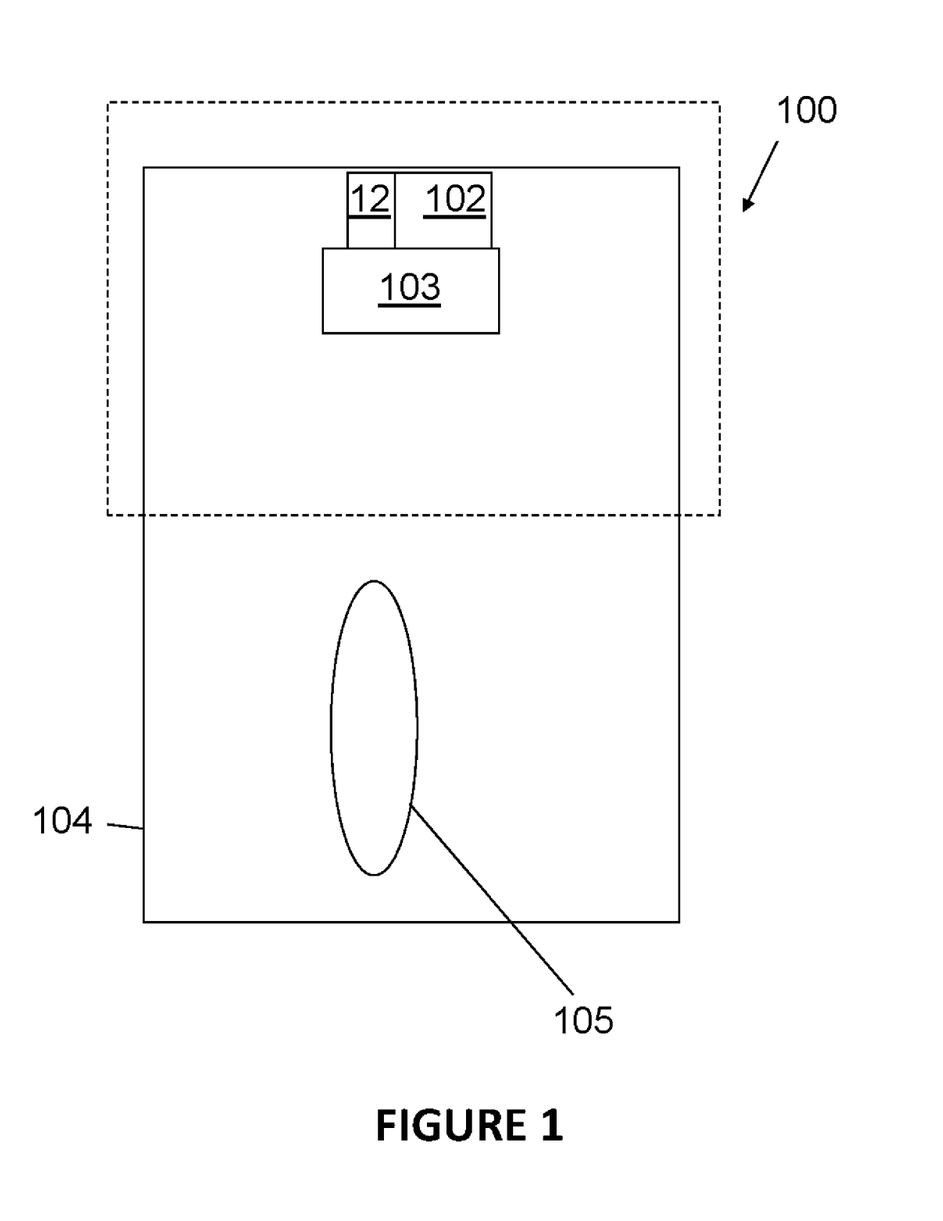
FIG. 1 is a schematic illustration of a system operable according to embodiments of the invention.

An example of a system operable according to embodiments of the invention is schematically illustrated in FIG. 1.

In the following description, various aspects of the present invention will be described. For purposes of explanation, specific configurations and details are set forth in order to provide a thorough understanding of the present invention. However, it will also be apparent to one skilled in the art that the present invention may be practiced without all the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," "detecting", "identifying", "assigning", "combining" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Terms such as "score", "threshold", "probability", "determination" and the like, refer to quantities and/or calculations within, the computing system's registers and/or memories.

In one embodiment the system 100 includes an image sensor 103 which may be part of a camera monitoring a space such as a room 104 or portion of the room 104 and obtaining images of the space (e.g., room 104). In one embodiment the camera is a 2D camera.

The image sensor 103 may be associated with a processor 102 and a memory 12. Processor 102 runs algorithms and processes to detect a human and/or to determine occupancy in the space based on input from image sensor 103, according to embodiments of the invention. Based on detection of a human and/or determination of occupancy, the processor 102 may output information or signals which may be used for controlling devices in the space, for counting occupants in the space, for monitoring occupants and more.

In one embodiment processor 102 is used to detect an object in a first image from a sequence of images obtained by image sensor 103. The processor 102 assigns a score to the object and tracks the object to a second image (i.e., an image obtained after the first image was obtained) from the sequence of images. A determination is made that the object in the second image is a human based on the score assigned to the object in the first image. Thus, an object in an image is determined to be a human based on a score assigned to the object or based on a probability of the object of being a human, in a preceding image, thereby adding to the accuracy and efficiency of detection of humans in images.

The score may include, for example, a value indicating a probability that the object is a human.

In some embodiments a score is assigned to the object based on parameters detectable from images. For example, a score may be assigned to an object in an image based on the shape of the object in the image and/or based on motion of the object and/or based on the location of the object in the image.

In one embodiment a first score is assigned to the object based on the shape of the object in a first image and a second score is assigned to the object based on the shape of the object in a second image. The second score may be dependent on the first score, i.e., the second score is determined, among other things, based on the first score. In one embodiment the scores may be combined and the object is determined to be a human based on the combination of scores.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Images obtained by the image sensor 103 are typically analyzed by processor 102. For example, image/video signal processing algorithms may be run by processor 102 or by another processor and may be used to analyze images from image sensor 103.

According to some embodiments images may be stored in memory 12. Processor 102 can apply image analysis algorithms, such as known motion detection and shape detection algorithms and/or machine learning processes in combination with methods according to embodiments of the invention to detect occupancy in a space.

Processor 102 may run shape detection/recognition algorithms to detect the shape of an object in an image. For example, shape detection/recognition algorithms may include an algorithm which calculates features in a Viola-Jones object detection framework. In another example, the processor 102 may run a machine learning process to detect a shape of an object. For example, a machine learning process may run a set of algorithms that use multiple processing layers on an image to identify desired image features (image features may include any information obtainable from an image, e.g., the existence of objects or parts of objects, their location, their type and more). Each processing layer receives input from the layer below and produces output that is given to the layer above, until the highest layer produces the desired image features. Based on identification of the desired image features a shape of an object may be determined.

The processor 102 may be in wired or wireless communication with devices and other processors. For example, output from processor 102 may trigger a process within the processor 102 or may be transmitted to another processor or device to activate a process at the other processor or device.

A counter may be run by a processor to count occupants according to embodiments of the invention. The counter may be part of processor 102 or may be part of another processor that accepts input from processor 102.

In one embodiment an image of a room 104 or part of the room obtained by image sensor 103 is analyzed by processor 102 to detect a shape of an object 105. In one embodiment the shape of the object 105 is a 2D shape. Processor 102 then determines, based on the detected shape of the object, and possibly based on other parameters, a score or probability of the object of being a human. The processor 102 or another processor tracks the object 105 to a second image (which is typically obtained after the first image) and a determination is made that the object 105 in the second image is a human based on the score or probability of the object in the first image of being a human.

In one embodiment the image sensor 103 is configured to obtain a top view of a space. For example, a camera including image sensor 103 may be located on a ceiling of room 104 typically such that its focal plane is parallel to the floor of the room 104, to obtain a top view of the room or of part of the room 104. Processor 102 may run processes to enable detection of objects from a top view, e.g., by using rotation invariant features to identify a shape of an object or by using learning examples for a machine learning process including images of top views of objects such as humans.

Figure 2:
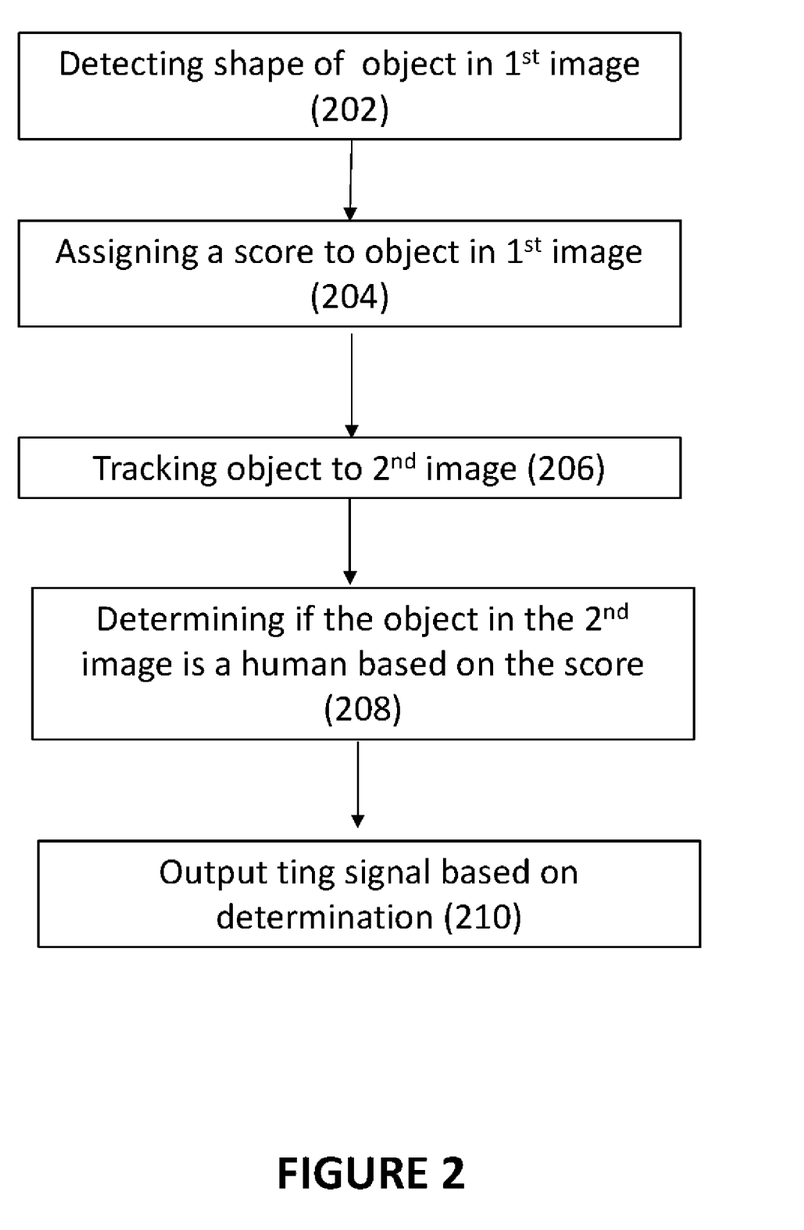
FIG. 2 is a schematic illustration of a method for determining if an object in a sequence of images is a human, according to an embodiment of the invention.

In one embodiment, which is schematically illustrated in FIG. 2, a method for determining that an object (e.g., object 105) in a sequence of images is a human may be carried out by processor 102. In one embodiment the method includes detecting an object in a first image from the sequence of images (202) and assigning a score to the object (204). The object is then tracked to a second, later, image from the sequence of images (206) and it is determined that the object in the second image is a human based on the score assigned to the object in the first image (208).

A score, which may be a mark or value indicating a probability of the object of being a human, may be assigned to an object based on a shape of the object in the first image. For example, a shape detection algorithm may be applied on the first image to detect the shape of the object and to determine the probability of the object of being a human based on its shape (e.g., by comparing the detected shape to a database of human shapes and determining how close the object's shape is to a shape of a human and/or by using other known methods for determining a probability that an object has a shape of a human).

In another embodiment the score is assigned to the object based on motion of the object. For example, the method may include applying motion detection algorithms on the sequence of images or on part of the sequence, and it may be determined that the object's movement is similar to typical human movements (e.g., movement at a certain speed, in predetermined directions, including a certain amount of pixels, etc.). The score may be assigned based on motion detected in images obtained prior to and/or after the first image was obtained. A score may also be assigned based on, for example, motion vectors typical to the human gait (e.g. hands and legs usually perform opposite movements), which may be determined from a single frame or a few consecutive frames.

In another embodiment the score is assigned to the object based on location of the object in the first image. For example, the first image may include areas, typically predetermined areas, where a human is expected to be (e.g., a human is expected to be found on the floor of a room but not on walls of the room, a human may be expected to be found in the area of the entrance to the room, etc.). If it is determined that an object is located in such an area where an occupant is expected to be found, the probability that the object at that location is a human may be raised.

In yet another embodiment the score may be assigned to the object based on the size of the object in the image. For example, a maximal or minimal size of a human in an image may be determined based on parameters of the camera used to obtain the image (parameters such as, the field of view of the camera, the distance of the camera from the object, etc.). If the size of an object is larger than the maximal size or smaller than the minimal size, the probability that the object is a human may be lowered.

In some cases the size of an object is dependent on the location of the object in the image. For example, objects in top view images may be distorted differently due to the different distance and/or direction of the objects from the camera imaging them. Therefore, shapes and sizes of objects in top view images are dependent on the location of the object in the image. Thus, for each location in the image a different size of the object may raise or lower the probability of the object being a human. Thus, in some embodiments a score may be assigned to an object based on the location and (inherently the size) of the object in the image.

A score may be assigned based on one or more of the parameters described above and/or based on other parameters indicating that an object in an image is a human.

The method may further include outputting a signal based on the determination that the object in the second image is a human (210), for example, the signal may include information regarding occupancy in the space. In another example, a signal may be output, which may be used for controlling devices in the space or at other locations, for counting occupants in the space, for monitoring occupants and more. In one example a signal based on the determination that the object in the second image is a human can be output to cause a number (e.g., an updated number) of occupants to be displayed or as a signal for other output to be used in analysis of the space (e.g., to determine occupancy at specific sites within the space) or as a signal for output to control a device such as an electronic device. An electronic device may include lighting and HVAC (heating, ventilating, and air conditioning) devices or other environment comfort devices or smart building management systems which may be controlled, such as activated or modulated, by a signal output based on the determination that the object in the second image is a human.

The object (e.g., object 105) may be tracked (e.g., by processor 102) through a sequence of images of the space (e.g., from the first image to the second image) using known tracking techniques such as optical flow or other suitable methods. In one embodiment an object is tracked based on its shape in the first image. For example, an object is detected in a first image from a sequence of images and a probability of the object of being human is determined. If the probability is above a predetermined threshold the object is tracked to a second image in the sequence of images. In one example, a selected feature from within the object from the first image is tracked. Shape recognition algorithms are applied at a suspected location of the object in a later obtained, second, image from the sequence of images to detect a shape of the object in the second image and a new selected feature from within the detected shape of the object is then tracked, thereby providing verification and updating of the location of the object in the images, based on their shape.

In one embodiment an initial determination that the object in the second image is a human may be done using known methods, such as by applying shape detection and/or other computer vision algorithms on the second image. The initial determination may then be verified or confirmed based on the score assigned to the object in the first image. Thus, for example, if the score assigned to the object in the first image highly indicates that the object is a human (e.g., the score is above a predetermined threshold), the initial determination of the object in the second image may be confirmed even if there is a low degree of certainty connected to the initial determination, whereas if the score assigned to the object in the first image is low (e.g., below the predetermined threshold), the initial determination in the second image may require a higher degree of certainty in order to be confirmed.

Figure 3A:
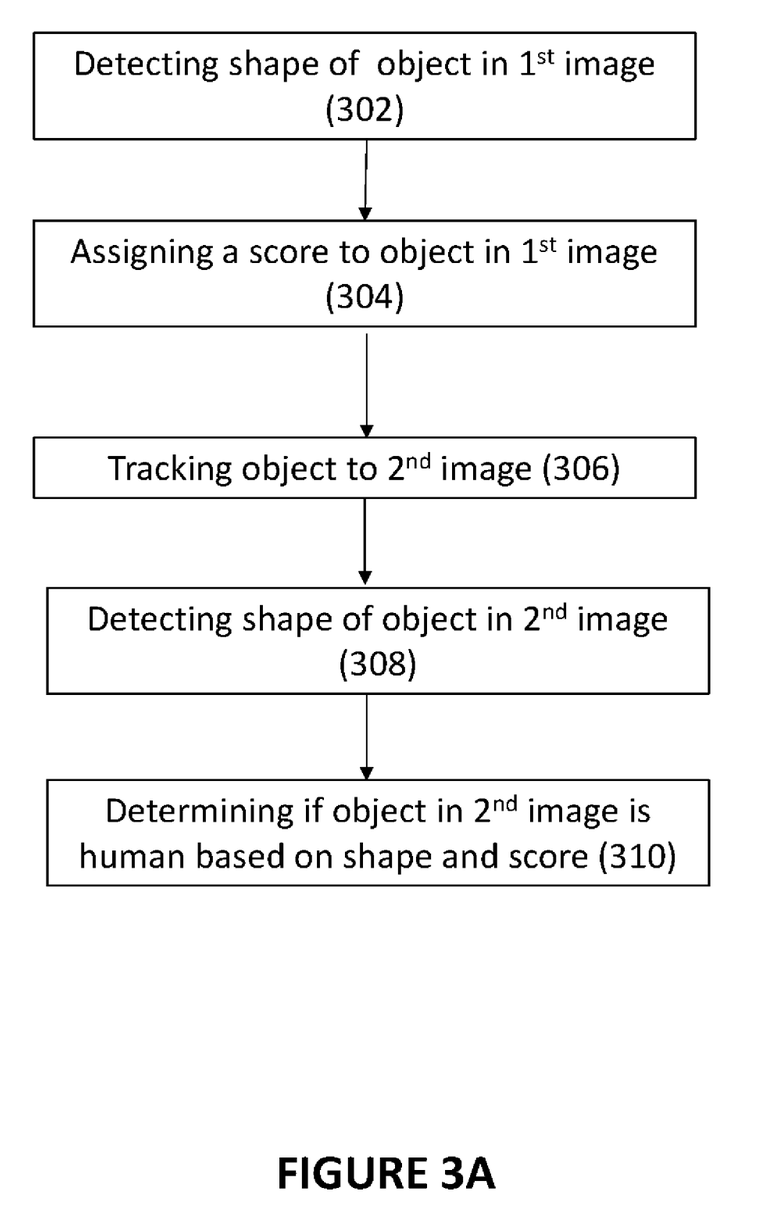
FIGS. 3A and 3B schematically illustrate methods for determining if an object in a sequence of images is a human based on a shape and/or other parameters of the object, according to embodiments of the invention.

In one embodiment the method, an example of which is schematically illustrated in FIG. 3A, includes determining that the object in the first image is a human based on a shape of the object in the first image and determining that the object in the second image is a human based on the shape of the object in the second image and based on the score assigned to the object in the first image.

In one embodiment the method includes detecting a shape of an object in a first image from the sequence of images (302), e.g., by applying shape detection algorithms on the first image, and assigning a score to the object based on the detected shape (304). The object is then tracked to a second image from the sequence of images (306). The shape of the object in the second image is detected (308), e.g., by applying shape detection algorithms on the second image, and it is determined if the object is a human based on the shape of the object in the second image and based on the score assigned to the object in the first image (310).

Thus, in some embodiments the method may include applying a shape detection algorithm on the first image and on the second image.

In other embodiments the object in the second image is determined to be a human based on motion of the object in the sequence of images and based on the score assigned to the object in the first image.

In yet other embodiments the object in the second image is determined to be a human based on a location of the object in the second image and based on the score assigned to the object in the first image. For example, an object may be determined to be a human in a first image and may be located within a predetermined area. In some embodiments, as long as the object is located within the predetermined area, it will be determined to be human. A predetermined area may be an area in vicinity of furniture, such as a desk, or other areas, as exemplified herein.

In some embodiments the object in the second image is determined to be a human based on one or more of the parameters described above and/or based on other parameters indicating that an object in an image is a human and based on the score assigned to the object in the first image.

In some embodiments a score is assigned to the object in the first image based on shape and/or other parameters and a score or determination that the object is a human in a second image is based on shape and/or other parameters and based on the score assigned to the object in the first image.

Figure 3B:
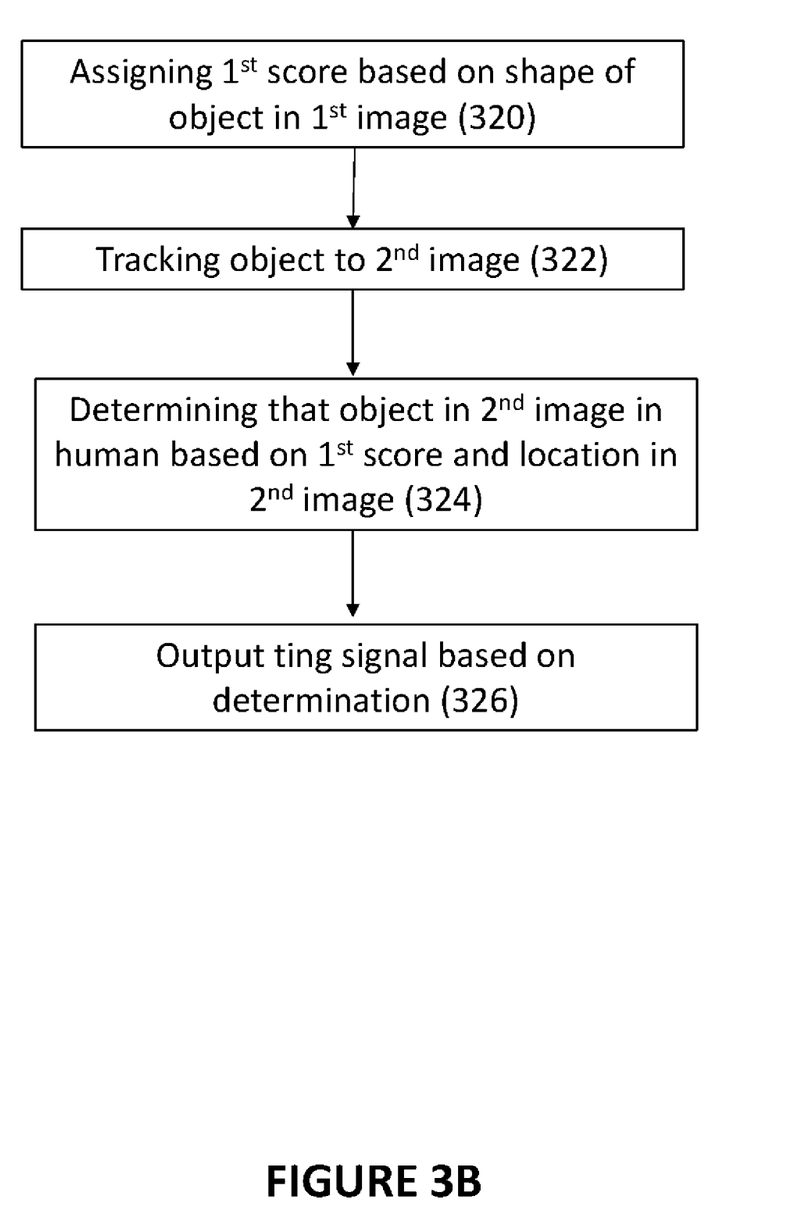

In one example, which is schematically illustrated in FIG. 3B, a first score is assigned to an object in a first image from the sequence of images, based on the shape of the object (320). The object is then tracked from the first image to a location in a second image (typically the second image is obtained after the first image) from the sequence of images (322). A determination that the object in the second image is a human is made (324) based on the score assigned to the object in the first image and based on the location of the object in the second image.

A signal (e.g., as described above) may be output (326) based on the determination that the object in the second image is a human.

Location of an object in the image may include a real world location. A location of the object in the image may be determined, e.g., by processor 102, using known methods and the location in the image may then be transformed to a real-world location by using, for example, projective geometry. The location may be represented as a coordinate or other location representation.

Location of an object within an area may be determined, for example, based on coordinates of the object in the image or, for example, by detecting that the object has crossed a predetermined virtual line in the image. In another embodiment an area in an image may be automatically determined using computer vision techniques. For example, an area may be defined as the vicinity of certain furniture (such as a bed, chair or desk) in a room and the furniture may be automatically detected from the image using known object detection algorithms.

Thus, for example, if an object determined to be a human (e.g., based on its' shape) is detected within a predefined area in a first image and that same object is detected within the predetermined area in a second, later, image then the object in the second image may be determined to be a human even if the probability that the object in the second image is a human is low (e.g., the shape of the object in the second image is less similar to a human than the shape in the first image). In an office space, for example, if it is determined that a human is in the vicinity of a desk or work station in a first image then that same object (the object that is tracked from a first image to a later image) will be determined to be a human in a later image if it is detected in the vicinity of the desk or work station, even if the shape (and/or other parameters, such as motion and/or size) of the object in the later image is less indicative of a human.

Thus, the location of the object in the second image may affect a threshold for determining if an object in an image is a human.

In some embodiments the method includes determining a threshold that is inversely related (e.g., inversely proportional) to the score assigned to the object in the first image. A second score is assigned the object in the second image and the second score is compared to the threshold. A determination that the object in the second image is a human, is made based on the comparison.

Figure 4A:
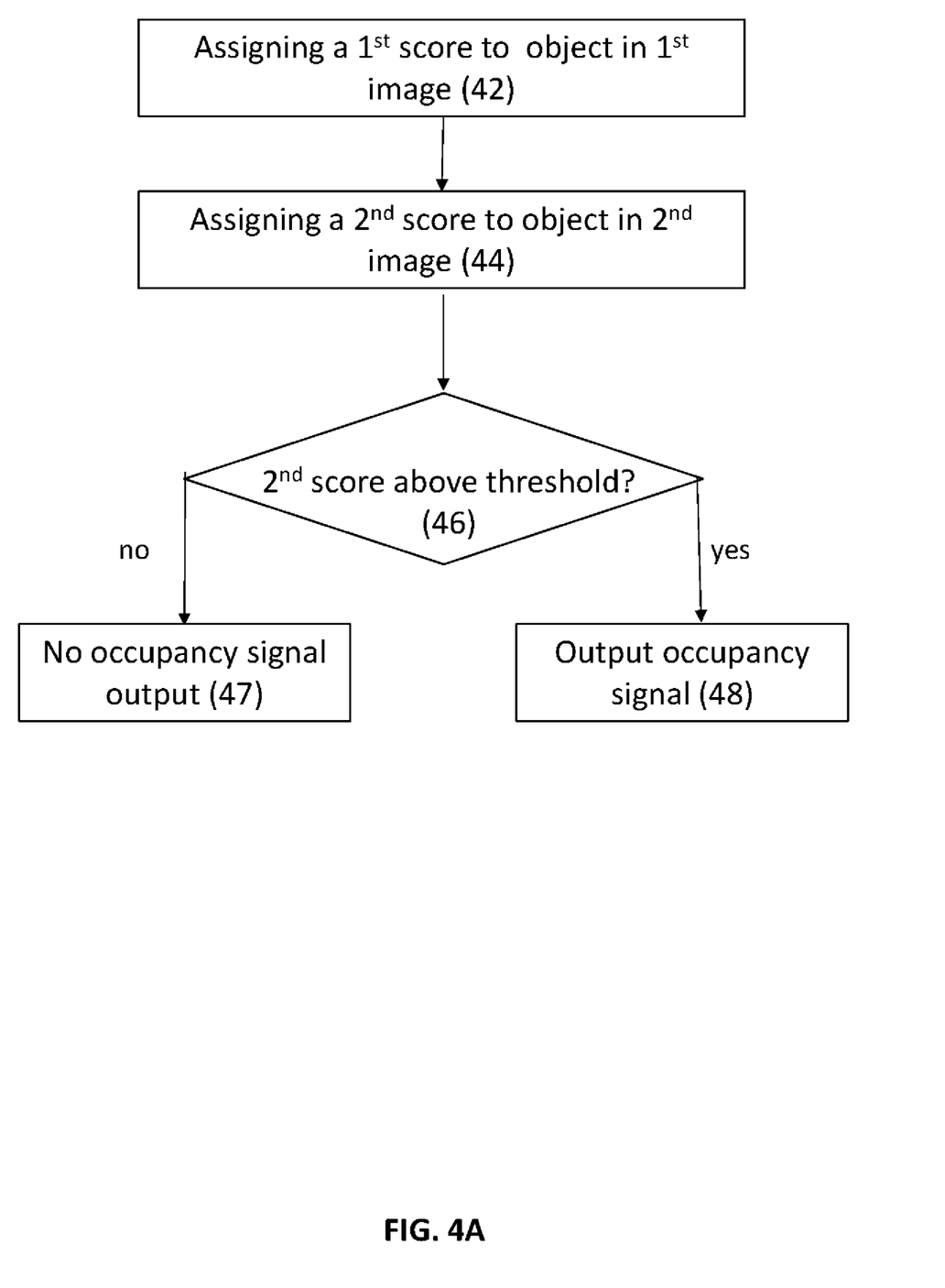
FIGS. 4A, 4B and 4C schematically illustrate methods for determining occupancy in a space, according to embodiments of the invention.

The determination that an object in an image is a human may be used to determine occupancy in the space. In one embodiment, which is schematically illustrated in FIG. 4A, a first score is assigned to the object in the first image (e.g., based on parameters of the object in the first image or in additional images, as described above) (42) and a second score is assigned to the object in the second image (e.g., based on parameters of the object in the second image or in additional images, as described above) (44). If the second score is above a certain threshold (46) then a signal indicating occupancy is output (48). If the second score is below the certain threshold (46) no signal indicating occupancy is output (47).

As described above, the first score may be assigned based on one or more of: a shape of the object in the first (and/or additional) image(s), motion of the object and location of the object in the first (and/or additional) image(s). Likewise, the second score may be assigned based on a shape of the object in the second, later obtained, image and/or based on additional parameters of the object in the second (and/or additional) image(s). In one embodiment a first score is assigned to an object in an image (42) and a second score is assigned to the object in a later image (44), the second score being dependent on the first score and on a location of the object in the later image.

The second score may be dependent on the first score, for example, by determining a weight of the second score based on a value of the first score. In another example a threshold for the second score is changed based on a value of the first score. Typically, the weight of the second score may be inversely related (e.g., inversely proportional) to the value of the first score and/or the threshold for the second score may be inversely proportional to the first score.

Figure 4B:
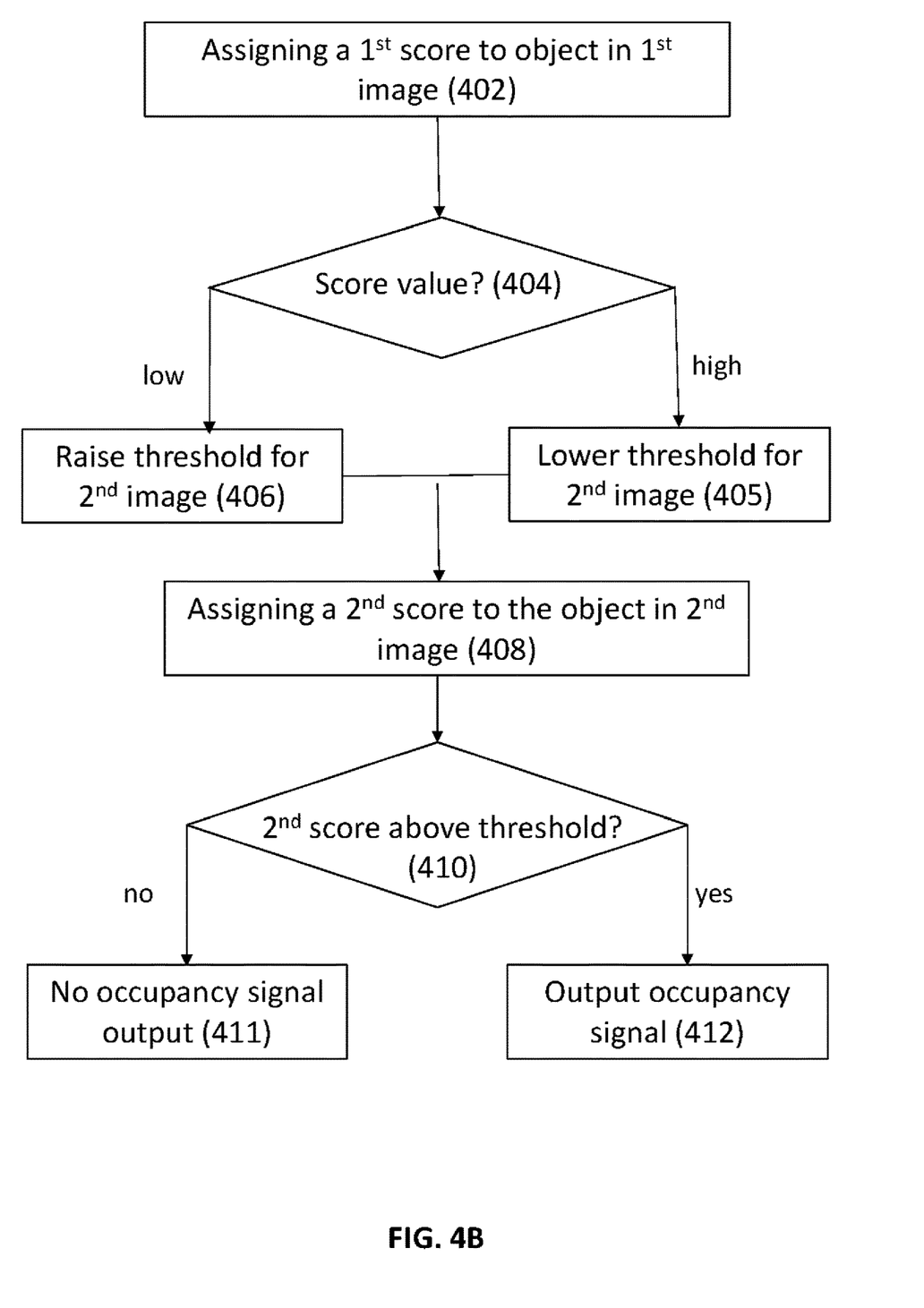

In one example, which is schematically illustrated in FIG. 4B, a method includes assigning a first score to the object in the first image (e.g., based on parameters of the object in the first image or in additional images, as described above) (402). If the first score (e.g., value of the score) is high (404) (e.g., above a predetermined threshold) then the threshold for the second score is lowered (405). If the first score (e.g., value of the score) is low (404) (e.g., below the predetermined threshold) then the threshold for the second score is raised (406).

A second score is assigned to the object in the second image (408) (e.g., based on parameters of the object in the second image or in additional images, as described above).

If the second score is above the threshold (410) then a signal indicating occupancy is output (412). If the second score is below the threshold (410) no signal indicating occupancy is output (411).

In one embodiment a first threshold is used to determine that an object is a human in a first image and a second threshold (the second threshold being lower or less strict than the first threshold) is used to determine that the object in the second image is a human.

Figure 4C:
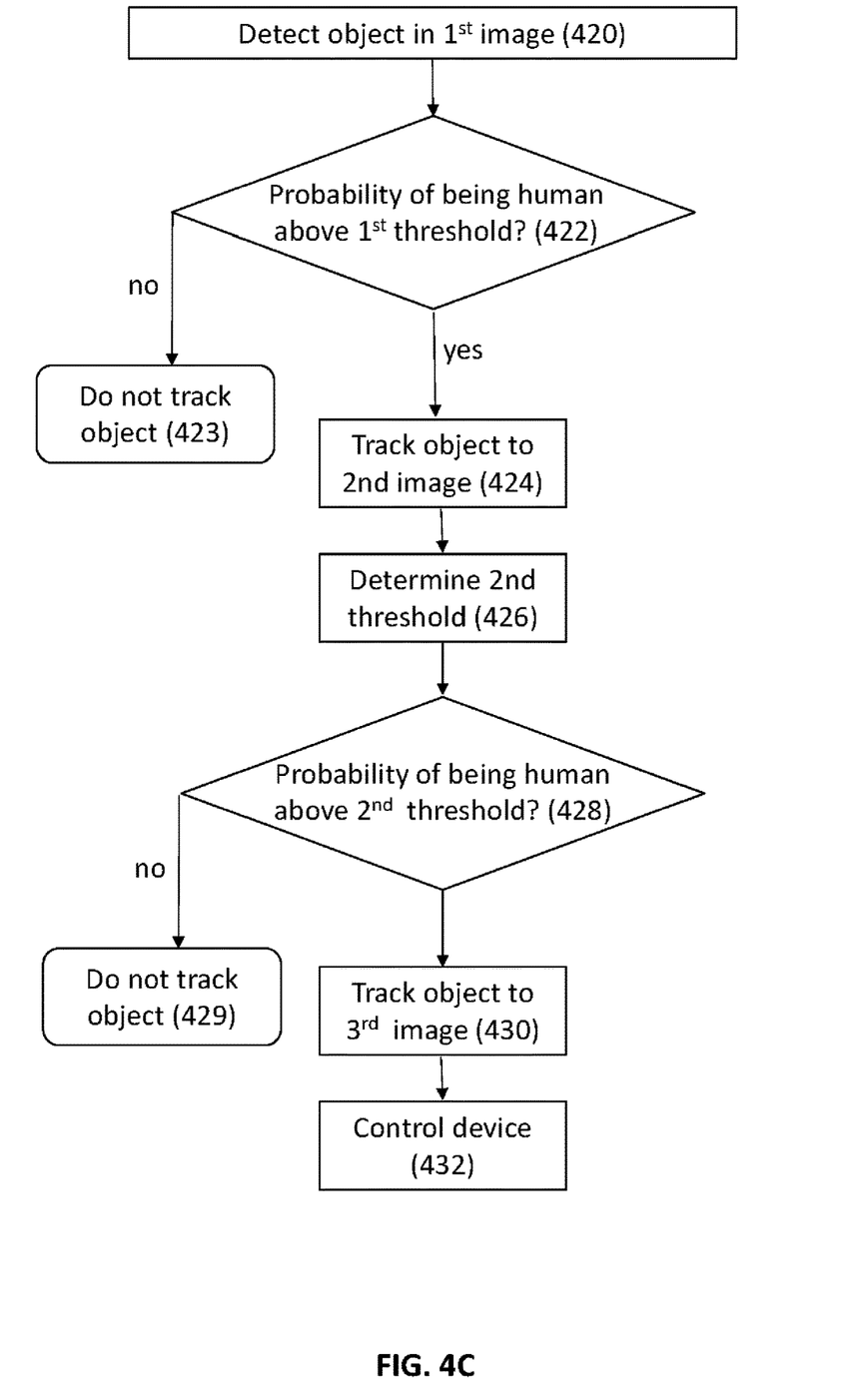

In one embodiment, which is schematically illustrated in FIG. 4C, a method for determining that an object in a sequence of images is a human includes detecting an object in a first image (420) and determining if the probability of the object being a human is above a first threshold (422). If the probability of the object in the first image of being a human is below the first threshold then the object is not tracked further (423). If it is determined that the object in the first image is a human (the probability of the object of being a human is above the first threshold) then the object is tracked to a second image (424) and a second threshold, which is lower than or less strict than the first threshold, is determined (426). If the probability of the object in the second image of being a human is below the second threshold (428) then the object is not tracked further (429). If it is determined that the object in the second image is a human (the probability of the object of being a human is above the second threshold) then the object is tracked to a third image (430) and a device may be controlled based on the determination that the object in the second image is a human (432).

In one embodiment the device may be controlled based on the tracking of the object, e.g., tracking the object from the first image to the second image and/or from the second image to the third image. For example, a device for counting occupants in the space or for monitoring occupants' locations in the space may be controlled based on the tracking of the object.

The first and second thresholds may relate to motion of the object in the images. For example, the thresholds may include a value representing a size of motion in the images (e.g., a number of pixels that changed between two images of the object). In another example the thresholds may include a time period (or number of consecutive images) in which no motion is detected the images. In some embodiments the thresholds may relate to a shape of the object. The threshold may include a combination of values. For example, a threshold may include the size of motion and the time period in which no motion is detected in the images. In another example, the first threshold may relate to the shape of the object in the first image and the second threshold may relate to motion of the object in the second image.

Figure 5:
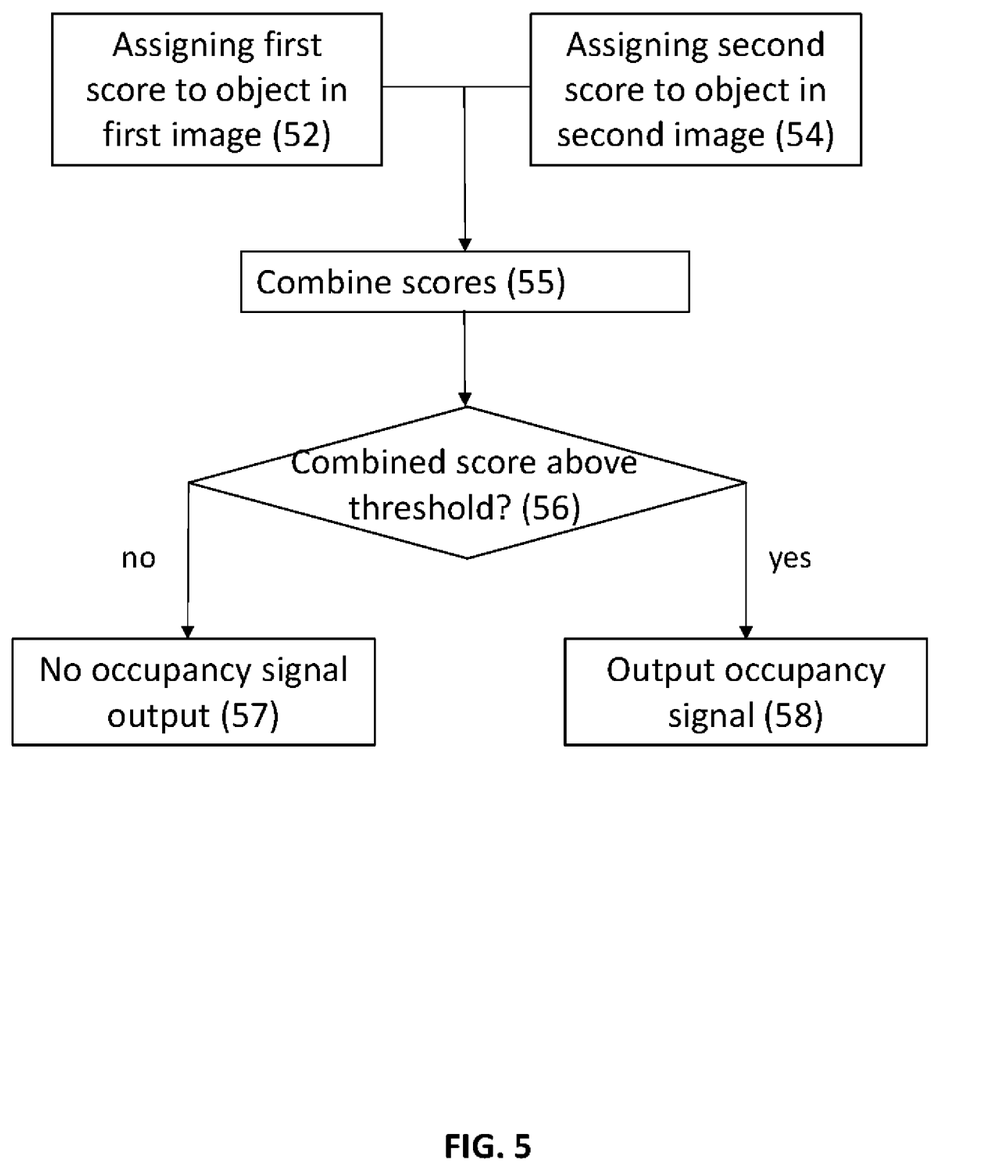
FIG. 5 schematically illustrates a method for determining if an object in an image is a human based on combining scores, according to embodiments of the invention.

In one embodiment, which is schematically illustrated in FIG. 5, an object in an image may be determined to be a human and/or occupancy may be determined based on a score determined from a combination of a first score and second score. In one embodiment a first score is assigned to the object in the first image (e.g., based on parameters of the object in the first image or in additional images, as described above) (52) and a second score is assigned to the object in the second image (e.g., based on parameters of the object in the second image or in additional images, as described above) (54). The first and second scores are combined (55). If the combined score is above a certain threshold (56) then a signal indicating occupancy is output (58). If the combined score is below the certain threshold (56) no signal indicating occupancy is output (57).

In some embodiments the second score is dependent on the first score.

Thus, in some embodiments an object in a sequence of images is determined to be a human and/or occupancy may be determined based on a determination of a probability of the object of being human in at least two images.

The invention claimed is:

1. A method for determining that an object in a sequence of images is a human, the method comprising
    detecting an object in a first image from the sequence of images;
    assigning a first score to the object;
    comparing the first score to a first threshold;
    determining that the object in the first image is a human based on the comparison of the first score to the first threshold;
    tracking the object to a second image from the sequence of images;
    assigning a second score to the object in the second image;
    comparing the second score to a second threshold that is lower than the first threshold;
    determining that the object in the second image is a human based on the comparison of the second score to the second threshold; and
    controlling a device based on the determination that the object in the second image is a human.

2. The method of claim 1 comprising assigning the first score to the object based on a shape of the object in the first image.

3. The method of claim 1 comprising assigning the first score to the object based on motion of the object.

4. The method of claim 1 comprising assigning the first score to the object based on location of the object in the first image.

5. The method of claim 1 comprising assigning the first score to the object based on a size of the object in the first image.

6. The method of claim 1 comprising determining that the object in the second image is a human based on a shape of the object in the second image and based on the comparison of the second score to the second threshold.

7. The method of claim 1 comprising determining that the object in the second image is a human based on motion of the object in the sequence of images and based on the comparison of the second score to the second threshold.

8. The method of claim 1 comprising determining that the object in the second image is a human based on a location of the object in the second image and based on the comparison of the second score to the second threshold.

9. The method of claim 1 comprising determining the second score based on a shape of the object in the second image.

10. The method of claim 1 wherein the sequence of images comprises top view images of the space.

* * * * *